United States Patent [19]

Harris

[11] 4,280,681
[45] Jul. 28, 1981

[54] CENTER LINK DISC VALVE

[75] Inventor: Edward Harris, Pittsburgh, Pa.

[73] Assignee: Koppers Company, Inc., Pittsburgh, Pa.

[21] Appl. No.: 110,782

[22] Filed: Jan. 9, 1980

[51] Int. Cl.³ .................. F16K 31/44; F16K 31/12
[52] U.S. Cl. .................................. 251/229; 251/56; 251/228
[58] Field of Search .................. 251/56, 228, 229

[56] References Cited

U.S. PATENT DOCUMENTS

| | | | |
|---|---|---|---|
| 1,656,183 | 1/1928 | Enz | 251/56 |
| 2,443,036 | 6/1948 | Hopkins | 251/229 |
| 3,857,545 | 12/1974 | Sonti | 251/229 |

FOREIGN PATENT DOCUMENTS 2535625 10/1977 Fed. Rep. of Germany .......... 251/228

Primary Examiner—Martin P. Schwadron
Assistant Examiner—A. Michael Chambers
Attorney, Agent, or Firm—Oscar B. Brumback

[57] ABSTRACT

A disc-type valve is disclosed which provides a design by which the valve disc can be positively and uniformly lifted laterally off the valve seat so as to prevent abrasion of the sealing surface and/or the valve seat which might otherwise be caused by transverse movement of the valve disc in relation to the valve seat. The opening and closing movement of the valve seat is controlled by and operable in direct relation to a pivotable operating member extending through the valve body.

11 Claims, 17 Drawing Figures

FIG. 1
FIG. 2
FIG. 3
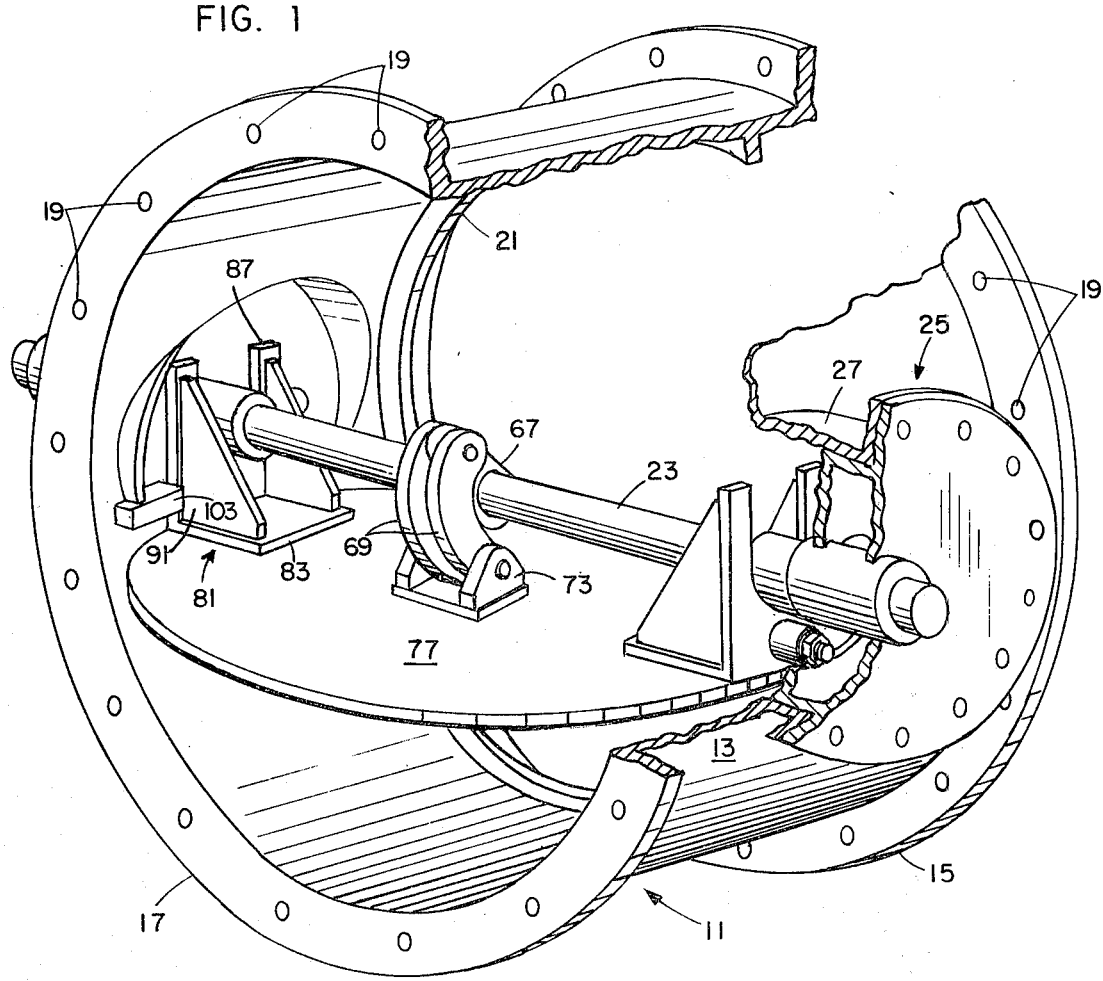
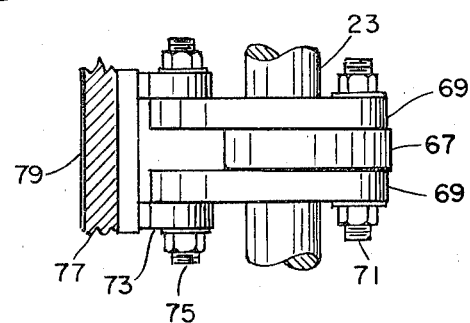
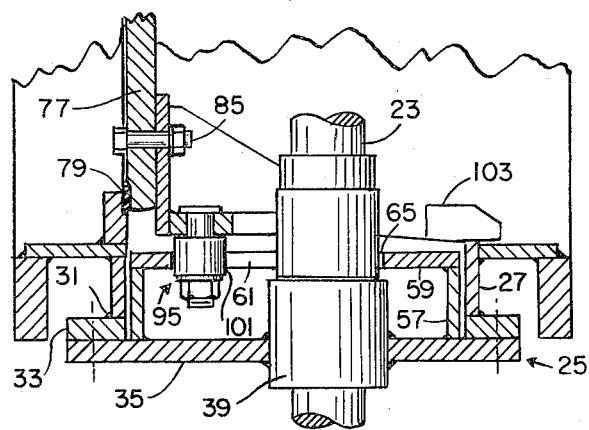

CENTER LINK DISC VALVE

BACKGROUND OF THE INVENTION

1. Field of the Invention

This invention relates to disc-type valves as used, inter alia, in industry in flow lines or pipe lines to control the flow of gaseous and fluid materials in pipelines.

2. Description of the Prior Art

Disc-type or plate valves, as commonly used in industry generally comprise four main components, to wit, a tubular body, a flange or seat circumferentially mounted within the tubular body, a disc or plate or plate with a peripheral seal mounted thereto, and an operating mechanism to move the discs from a position against the seat to a position generally parallel to the flow path of material transversing the valve. The conventional disc valves incorporate operating mechanisms which merely transversally move the disc in a 90° arc from against the seat and back again to close the valve. Because the edge of the disc cannot be pushed through the seat, the pivotal center of this arc cannot be transversally on the disc but, rather, must be offset away from the plane of the seat. Thus the whole disc travels through an arc rather than merely pivoting about a transverse axis. A valve such as this is shown in British Pat. No. 405,439 to Dick et al.

Referring to the Dick et al British Patent, it will be noted that as the disc arcs away from the seat, the upper edge of the disc, in particular the seal about that area, is caused to slide or drag across the seat as the disc moves out of parallel with the seat. Such slide or drag causes a propensity for wear on both the seat and the seal.

The seals in these types of valves, must be somewhat flexible to permit them to conform to the inherent surface irregularities of metal seats. Seals generally are formed of either a synthetic elastomer, for example, silicone rubber, or a soft metal such as series 1100 aluminum or OFHC copper where operating temperatures are too high for elastomers. None of the available seal materials are particularly wear resistant and, thus, deteriorate rapidly in valves which operate generally as shown in the Dick et al British Patent.

Disc-type valves have been developed which overcome the problem of seal and seat abrasion by linearly retracting the disc from the seat before beginning the arc movement. Such valves are shown in U.S. Pat. No. 4,073,470 to Harris and U.S. Pat. No. 4,073,472 to Chasey. However, there is another problem with these newer valves. Since the valve disc and the interior of the valve are enclosed, a person operating the valve is unable, under normal operating circumstances, to view the inside of the valve. The degree of rotation of the operating shafts of these valves does not bear a direct one-to-one relationship with the degree of arc movement of the disc. Thus it is difficult for the operator to readily determine how far open or closed the disc is when he wants to regulate the flow of material passing through the valve as distinguished from either fully opening or completely closing the valve. This problem is also present in the valve disclosed in British Patent No. 405,439.

The object of the present invention is to incorporate both a lateral movement of the disc in relation to the seat, so as to prevent seal and seat abrasion, and to provide a positive, easily deteminable means to regulate material flow through the valve.

SUMMARY OF THE INVENTION

The present invention is directed primarily to an improvement in the opeating mechanism of a disc-type valve whereby the disc is laterally moved to or from the seat while the disc is maintained in a planar position which is parallel to the plane of the seat. A means is utilized to follow a track, the track being positioned to direct a cam perpendicularly in relation to the plane of the seat. The cam is operable such that the disc moves concurrently and in the same direction as the cam. The track is complex in that it comprises a linear segment which is transposed into an arc segment, the track arc segment, vis a vis the linear segment, being more remove from the seat. Thus when the cam means, operating to follow the track, is functioning in regard to the linear segment of the track, the disc moves, correspondingly, in a linear fashion. When the cam means is functioning in regard to the arc segment of the track, the disc moves, correspondingly, in an arced path.

The valve disc is operated by a pivotable member which provides the center of pivotation for the disc. A pivot arm means is fixed to the pivotable member and flexibly linked to the disc such that pivotation of the pivotable member produces motion of the disc both linearly and in an arced path as directed by the relationship of the cam means and track. Guide means are also employed to insure uniformity and smoothness of movement of the disc and, specifically to monitor the pivotal axis of the disc parallel to the axis, the axis being the pivotable member.

The valve is operable in all positions, not being dependent in any way on gravitational forces. Operation can be either mechanical or manual, there being a direct uniform relationship between the degree of pivotation of the pivotable member and the movement of the disc.

These and other features of the present invention will be more completely disclosed and described in the following specification, the accompanying drawings and the appended claims.

BRIEF DESCRIPTION OF THE DRAWINGS

FIG. 1 is a cut away projection view of the Center Link Disc Valve.

FIG. 2 is a plan view of the center link mechanism of the valve showing the arrangement of such in relation to the disc and the pivotable shaft.

FIG. 3 is a plan view of a cam housing showing the arrangement of the cam and guide in relation to the disc and pivotable shaft.

DETAILED DESCRIPTION

Figure 6:
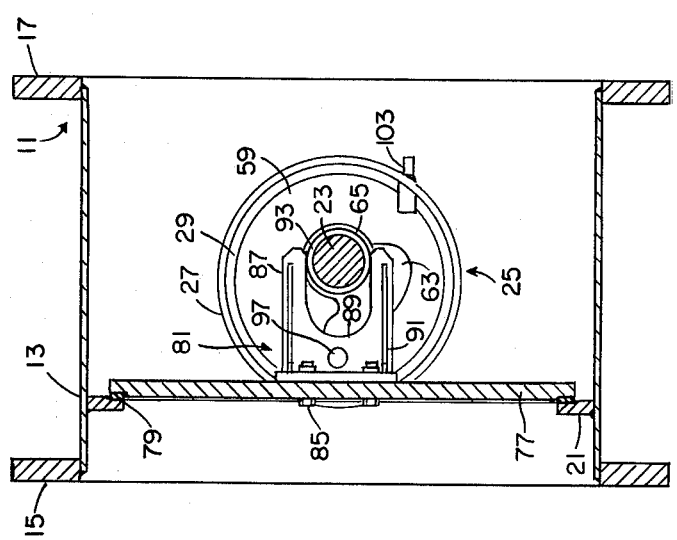
FIG. 6 is a cross sectional side elevation view of the Center Link Disc Valve showing the arrangement of the guide in relation to the disc and the pivotable shaft, as viewed from VII—VII of FIG. 7.

Referring to FIG. 1, a valve body 11 is illustrated which is composed of a tubular shell 13 with a front flange 15 and a rear flange 17 fixed, respectively, at the axial ends of the tubular shell 13. Through each of the flanges 15, 17 are a plurality of bolt apertures 19 to permit each of the flanges 15, 17 to be fastened to corresponding flanges (not shown) in a pipeline system. Also fixed to the tubular shell is a valve seat 21 in the form of a flat ring, the outer circumference of which is fixed to the interior surface of the tubular shell 13 adjacent to the front flange 15. Although in FIG. 1, the tubular shell 13, the flanges 15, 17 and the valve seat 21 appear cut away for illustration purposes, in practice they are continuous, forming 360° arcs.

A pivotable shaft 23 is directed transversally through the mid point of the tubular shell 13 in a position which is perpendicular to the central axis of the tubular shell 13. Circumferentially and cocentrically surrounding each end of the pivotable shaft 23 is a cam housing 25. The two cam housings 25 are mounted on tubular shell 13 opposite each other as shown best in FIGS. 7 and 8 with the pivotable shaft 23 extending therethrough. Each of the cam housings is composed of a tubular extension 27 which is fixed through the circumference of a circular operating aperture 29 positioned in the side of the tubular shell 13 and being concentric with the pivotable shaft 23. Mounted to the outer end 31 of each tubular extension 27 is a plate flange 33. Removably mounted to each of the plate flanges 33 is a bearing mount plate 35. Both the plate flanges 33 and the bearing mount plates 35 have alignable bolt aperatures 37 to permit the bearing mount plates 35 to be bolted to the plate flanges 33. Fixed through each bearing mount plate 35 is a tubular bearing support sleeve 39 which is aligned with the axis of the pivotable shaft 23 when the corresponding bearing mount plate 35 is mounted to the corresponding plate flange 33. Mounted within each bearing support sleeve 39 is a shaft bearing 41. Each shaft bearing 41 is made, preferably, of oil impregnated bronze, although other bearing materials can be used. Alternatively, a roller or ball bearing could be used as a shaft bearing 41. At the outer end of each bearing support sleeve is fixed sleeve flange 43.

Figure 7:
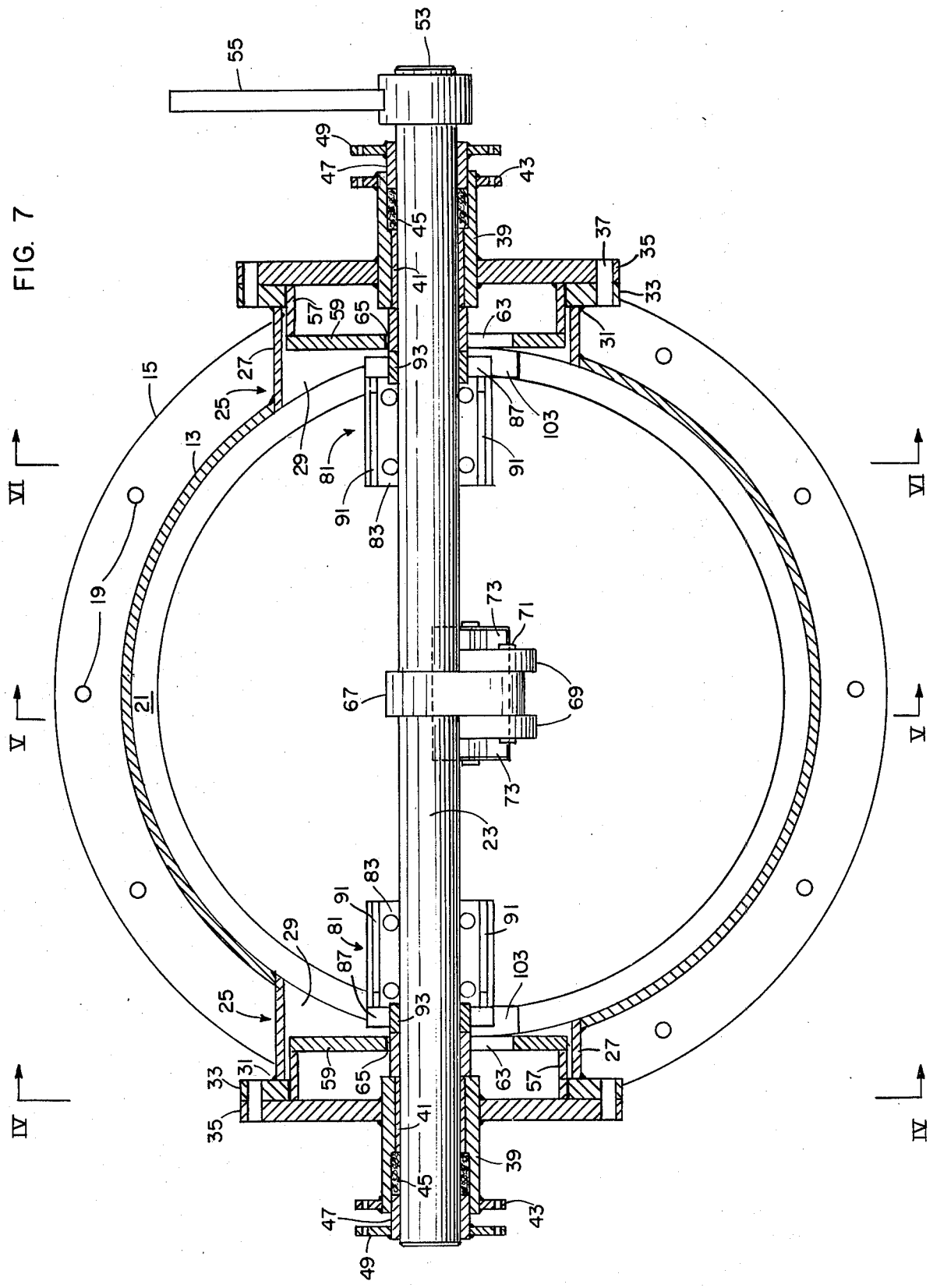
FIG. 7 is a cross sectional rear elevation view of the Center Link Disc Valve showing the arrangement of the cam housings and center link mechanism in relation to the pivotable shaft, as moved from VIII—VIII of FIG. 4.
Figure 8:
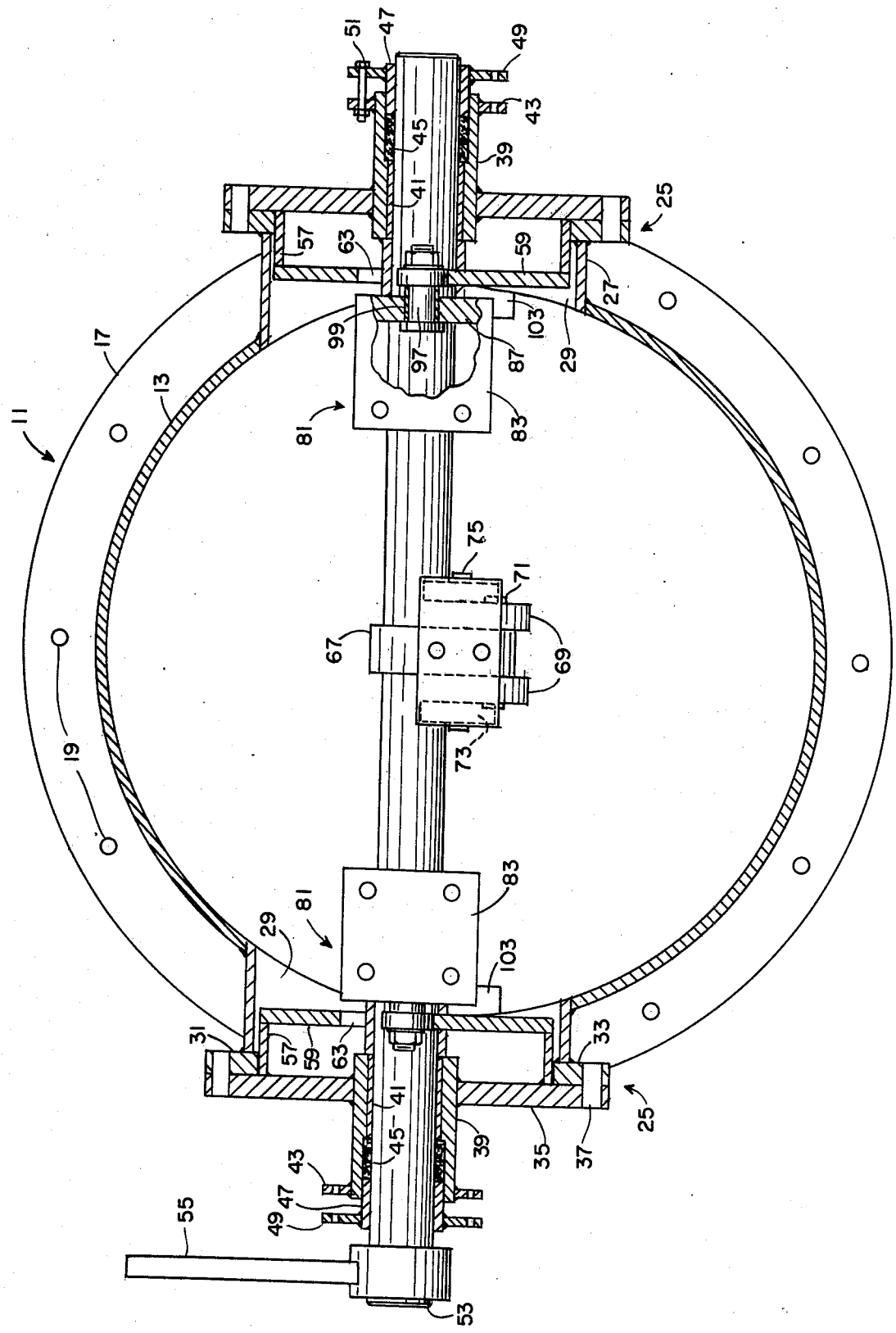
FIG. 8 is a cross sectional front elevational view of the Center Link Disc Valve showing the arrangement of the cam housings and center mechanism in relation to the pivotably shaft, as viewed from IX—IX of FIG. 4.
Figure 9:
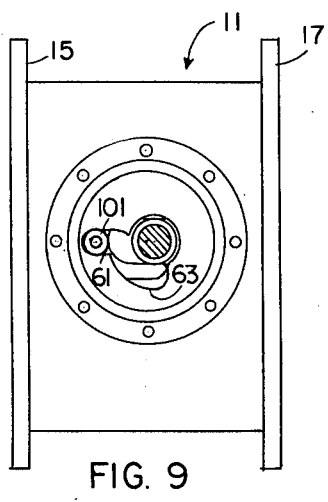
FIGS. 9-11 are equivalent views to those illustrated in FIGS. 4-6, respectively, except smaller in scale, showing the valve in a closed disposition.

The pivotable shaft 23 extends concentrically through the shaft bearings 41 which, in turn, are concentrically mounted within the support sleeves 39. Thus, the pivotable shaft 23 is pivotably mounted near its two ends in the shaft bearings 41 and directly supported thereby. At the outward ends of each shaft bearing 41 is a packing gland 45 which functions to prevent the material traversing the valve from leaking out past the shaft bearing 41. Concenctional saturated rope-type packing material may be used for these packing glands 45 as well as many other types of packing materials that are well known to those with skill in the art. A packing compression sleeve 47 is superimposed on each packing gland 45 to compress the material of the packing gland 45 and insure that there is a fluid-tight seal. A compression flange 49 is fixed to each packing compression sleeve 47 about as shown in FIGS. 8 and 9. A plurality of draw fasteners are used to secure the compression flanges 49 to the sleeve flanges 43 and to draw the packing compression sleeve inwardly, into the bearing support sleeves 39 to compress the packing glands. Such a draw fastener is illustrated as a nut and bolt assembly 51 as shown in FIG. 7.

The pivotable shaft 23 extends, outwardly, further from the bearing support sleeve 39 and packing compression sleeve 47 on one end than it does on the other. This further extension is the opeator end 53 of the pivotable shaft 23. Mounted to the operator end 53 is a means for pivoting 55 the pivotable shaft 23. As illustrated in FIGS. 7 and 8 this means for pivoting may be a lever. For manual operation of the Center Link Disc Valve it could also be a wheel or a crank, etc. Powered means for pivoting 55 could also be utilized, for example, an hydraulic cylinder operable with a lever, or a gear reduced electric motor. In the preferred embodiment, an hydraulic cylinder (not shown) is utilized in conjunction with the lever shown in FIGS. 7 and 8.

Figure 5:
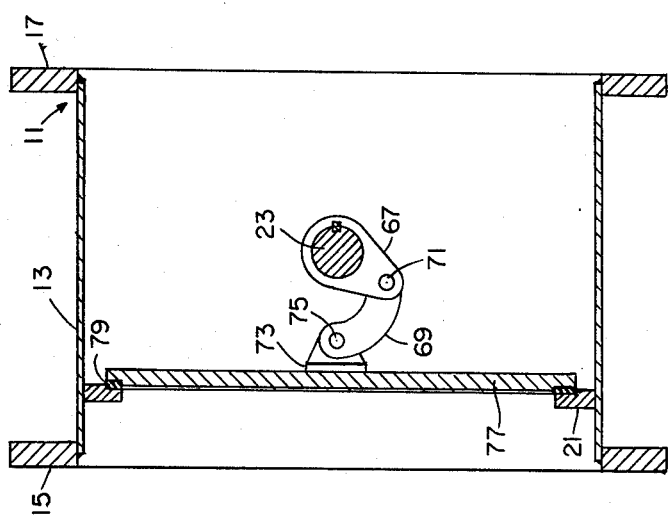
FIG. 5 is a cross sectional side elevation view of the Center Link Disc Valve showing the arrangement of the center link mechanism in relation to the disc and the pivotable shaft, as viewed from VI—VI of FIG. 7.

Fixed to each plate flange 33, inboard from the point at which that plate flange 33 is attached to the corresponding tubular extension 27, is a track suspension sleeve 57 which extends inwardly, toward the center of the valve, from the plate flange 33 and is concentric with that corresponding tubular extension 27. Each of the track suspension sleeves 57 is buttressed on its inward end with a track 59 which takes the form of a circular plate having an aperture cut therethrough. Referring to FIG. 5, the aperture consists, initially, of a straight slot section 61 which transcends into an arced slot section 63 which travels through a 90° arc. Also, a portion of the aperture is a circular clearance port 65 through which the pivotable shaft 23 extends.

At about the longitudinal mid-point of that portion of the pivotable shaft 23 which extends through the valve body 11, is positioned a lever arm 67 which is fixed to the pivotable shaft 23 and extends perpendicularly away from the longitudinal axis of the pivotable shaft 23. A pair of curved links 69 are pivotably mounted to the end of the lever arm 67, at the end of the lever arm 67 which is remote from the pivotable shaft. The axis of pivotation of the mount of the curved links 69 to the lever arm 67 is parallel to the axis of pivotation of the pivotable shaft 23. As illustrated in FIG. 2, the means of pivotably mounting 71 the curved links 69 to the lever arm 67 is a bolted stud assembly. The pair of curved links 69 are arranged, one on either side of the lever arm 67. Each of the curved links 69 is positioned parallel to the lever arm 67.

Each of the curved links 69 are arced such that when they are pivoted, in relation to the lever arm 67, towards the pivotable shaft 23, the interior of the arcs of those curved links 69 partially encompass the pivotable shaft 23 such that a line drawn between the means of pivotably mounting 71 and the ends of the curved links 69 remote therefrom, would approach a tangent drawn on the circumference of the pivotable shaft 23. Those remote ends of the curved links 69 are pivotably mounted to a clevis 73 by means of pivotable mounting 75 which is similar to means of pivotable mounting 71. As illustrated in FIG. 2, means of pivotable mounting 75 is a bolted stud assembly.

The clevis 73 is fixed centrally to the valve disc 77 which is circular and generally flat and is the main functioning member of the Center Link Disc Valve in that it functions to open and close the valve and is positionable, within the valve body 11, so as to regulate the flow of material through the valve. The valve disc 77 is shown in FIG. 1 in the fully open position and is shown in FIGS. 5, 6 and 7 in the fully closed position. Sectional portions of the valve disc are shown in FIGS. 2 and 3 in the fully closed position. The valve disc 77 may either be a flat plate type or a dish type. In operation the valve is mounted such that, when the valve disc 77 is in the closed position, the higher line pressure is on the clevis 73 side of the valve disc 77 while the lower line pressure is on the side of the valve disc 77 which is opposite from the clevis 73.

In the closed position, the valve disc 77 is mated to the valve seat 21 as shown in FIGS. 3, 5 and 6. Interposed between the mating surfaces of the valve disc 77 and the valve seat 21 is seal means 79. In the preferred embodiment this seal means is an elastomer seal ring of a size compatible with the valve disc 77 periphery. However, it need not even be a separate item in that the valve seat 21 and the valve disc 77 may be made of dissimilar metals, one being softer than the other. Thus the mating surfaces would form a metal-to-metal contact, the softer metal giving somewhat to conform to the harder metal to form a seal. Alternatively a soft metal ring could be mounted on either the valve disc 77 or the valve seat 21 to form a seal means 79. Such a metal might be soft aluminum, or copper with a low temper.

The valve disc 77 and the pivotable shaft 23 are positioned and arranged such that at all times the longitudinal axis of the pivotable shaft 23 is aligned with the center of the valve disc 77, that longitudinal axis at all times being held parallel to a diameter line that could be drawn through the planar center of the valve disc 77. The valve disc 77 moves at all times in relation to the pivotable shaft 23 which is not physically displaced but, rather, merely pivots in position. Thus the longitudinal axis of the pivotable shaft 23 serves as the center of pivotation of the valve disc as it pivots through a 90° arc as hereinafter described.

Adjacent to the two points where the pivotable shaft 23 extends beyond the periphery of the valve disc 77 are positioned, respectively, a pair of guides 81, fixed to the valve disc 77. Each of the guides 81 consists of a base 82 in the form of a flat plate, as shown in FIGS. 6, 7 and 8, fixed to the valve disc 77, preferably by bolt and nut assemblies 85 as shown in FIG. 6. Perpendicular to each base, extending away from the valve disc 77 towards the pivotable shaft 23 is two-pronged fork 87 having a concave radius 89 between the two prongs about as shown in FIG. 6. As is best shown in FIG. 8, each of the forks 87 is positioned, in relation to its corresponding base 83, at the edge of the base which is closest to the adjacent periphery of the valve disc 77. Each of the guides 81 includes a pair of braces 91 to provide additional structural support between the bases 83 and their respective forks 87, the braces 91 being positioned about as shown in FIG. 1 with each brace 91 being fixed to both the fork 87 and the base 83 as there shown.

Referring to FIG. 6 the two prongs of the fork 87 extend to a point where they cross over and under the pivotable shaft 23. At the point where this intersection occurs, a guide bearing 93 is mounted on the pivotable shaft 23. Since there are two guides 81, there are also two guide bearings 93 as shown best in FIG. 7. In the preferred embodiment, the guide bearings 93 are bronze bushings fitted over the pivotable shaft 23 and positioned to be aligned with the forks 87 to which each corresponds. The outside diameters of the guide bearings 93 are matched to the dimension of the gap between the two prongs or tines of each of the corresponding forks 87 as shown in FIGS. 7 and 8. The radius 89 of each of the forks 87 is equivalent in dimension to the outer radius of the corresponding guide bearing 93. Thus, viewing the valve as shown in FIG. 7, as the valve disc 77 moves away from the valve seat 21, to the right of the drawing figure, the forks 87 move laterally across the guide bearings 93 until the radius 89 of each fork 87 butts up against the corresponding guide bearing 93. The arrangement of the valve disc 77, a guide 81 and its corresponding fork 87, in the position wherein the valve disc 77 has been moved away from the valve sent 21 is illustrated in FIG. 14.

Figure 4:
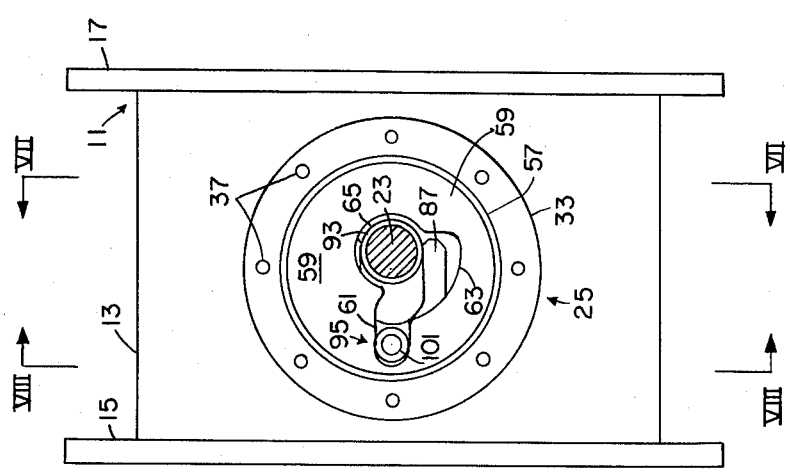
FIG. 4 is a side elevation view of the Center Link Disc Valve showing a sectional view of the cam housing, as viewed from V—V of FIG. 7.

Rotably mounted on the outward side of each guide 81 is a cam 95 as shown in FIGS. 4 and 8. Each cam includes a cam spindle 97 which extends through a cam bearing 99 which is fixed through a mounting aperture in the corresponding fork 87 between the radius 89 and base 83 thereof, being positioned about as shown in FIG. 6. Outboard from each guide 81, a cam roller 101 is fixed to each cam spindle 97 and is aligned with the corresponding track 59. Each cam spindle 97 and the cam roller 101 rotate in a cam bearing 99, the cam rollers 101 being of the proper size and positioned to ride within the horizontal slot sections 61 and arced slot sections 63 of the tracks 59 as illustrated in FIG. 4.

Figure 10:
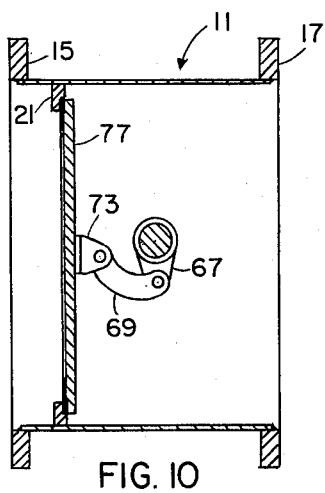
Figure 11:
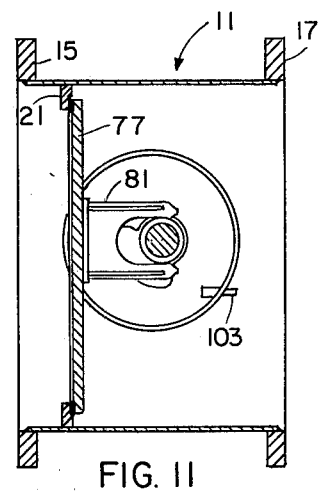

Referring to FIGS. 9–11, the center Link Disc Valve is illustrated in its closed position. FIG. 9 shows a track 59 with the corresponding cam 95, specifically the cam roller 101, in position at the forward end of the horizontal slot section 61. The fork 87 of the guide 81 is shown with its radius 89 displaced forwardly from the guide bearing 93 mounted on the pivotable shaft 23 in both FIGS. 9 and 11. The lever arm 67, shown in FIG. 10, is disposed in its most forward position and the curved link 69, similarly disposed, is arranged to exert pressure through the clevis 73 onto the valve disc 77, ursing the valve disc 77 toward the valve seat 21 so as to fully engage the seal means 79 against the valve seat 21.

Figure 12:
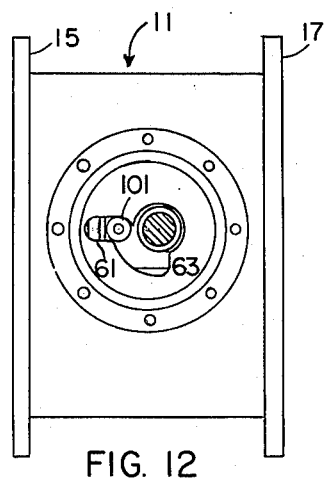
FIGS. 12-14 are equivalent views to those illustrated in FIGS. 9-11, respectively, showing, however, the valve disc retracted from the valve seat.
Figure 13:
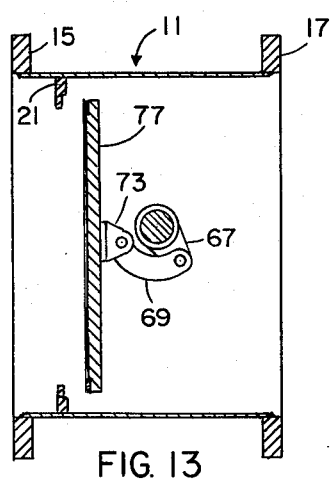
Figure 14:
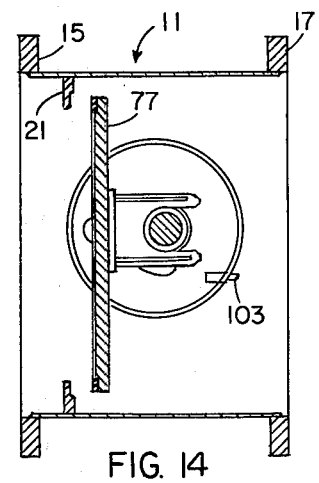
Figure 15:
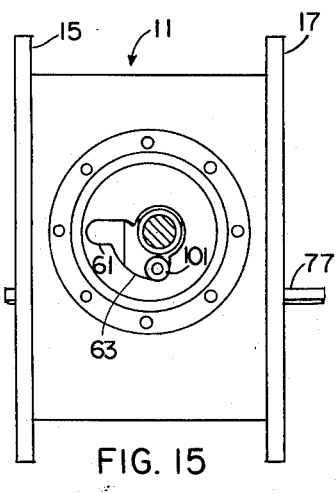
FIGS. 15-17 are equivalent views to those illustrated in FIGS. 9-11, respectively, showing however, the valve in a fully opened disposition.
Figure 16:
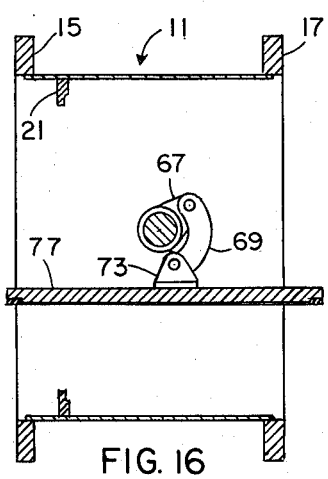
Figure 17:
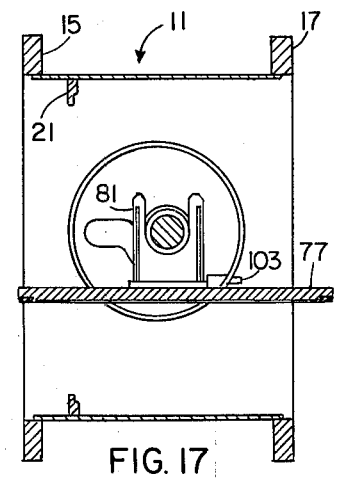

To open the valve, the pivotable shaft 23 is pivoted counter clockwise in relation to the position of the valve shown in FIGS. 9–17. Such pivotation is effected by the means for pivoting 55 as illustrated in FIGS. 7 and 8 and discussed hereinbefore. The first stage of the opening procedure is to pivot the pivotable shaft 23 to the degree illustrated, beginning as shown in FIG. 10, to that shown in FIG. 13. It will be noted from viewing FIGS. 13 and 14 that the valve disc 77 is still positioned parallel with the valve seat 21 but is disposed rearwardly from the valve seat 21 and toward the pivotable shaft 23. From the position indicated in FIGS. 9–11 to the position indicated in FIGS. 12–14, the valve disc 77 has been moved laterally away from the valve seat 21 without the seal means 79 being transversally moved across the valve seat 21. Rather, the seal means 79 has been effectively lifted uniformly off of the valve seat 21. This phenomena has been effected by the cam roller 101 travelling rearward from its position shown in FIG. 9 to the position shown in FIG. 12. Due to the fact that the cam roller 101 moves, initially, within the straight slot section 61 of the track 59, and that the position of the cam roller 101 is fixed in relation to the valve disc 77, the valve disc 77 is prevented from moving, initially, in any direction other than laterally rearward, as the pivotable shaft 23 is pivoted from the position shown in FIG. 10 to that shown in FIG. 13. The guides 81, as illustrated in FIGS. 11, 14 and 17, maintain the alignment of valve disc 77 in relation to the longitudinal axis of the pivotable shaft 23 and also prevent any pivotation of the valve disc 77 while the cam rollers 101 are engaged within the straight slot section 61 of the tracks 59.

As will be noted in viewing FIGS. 10 and 13, the pivotation movement of the pivotable shaft 23 is translated to a linear force by the eccentric movement of the remote end of the lever arm 67 applying linear motion to the curved link 69. The curved link 69, in turn, draws the valve disc 77 linearly rearward from the position shown in FIG. 10 to that shown in FIG. 13. Simultaneously with this valve disc 77 movement, the guides 81 slide laterally rearward bringing the radius 89 of the fork 87 into contact with the guide bearing 93 as shown in FIG. 14.

From the arrangement illustrated in FIGS. 12-14, the pivotable shaft 23 is pivoted, again counterclockwise in regard to the views of the valve shown in FIGS. 9-17, to the arrangement shown in FIGS. 15-17. The flat face of the valve disc 77 is pivoted 90° from the position shown in FIGS. 13 and 14 to that shown in FIGS. 16 and 17, thus fully opening the valve. The pivotation of the valve disc 77 need not progress through the full 90° arc but may be halted at any point on that arc to effect a control of the volume and rate of flow material passing through the valve. In part, the disposition of the valve disc 77 shown in FIGS. 13 and 14 will permit a limited passage of material through the valve, albeit, relatively little in comparison to that which occurs when the valve disc 77 is positioned as shown in FIGS. 16 and 17.

Comparing FIG. 12 with FIG. 15, it will be noted that the cam roller 101 has left the straight slot section 61 of the track 59 and has entered and traversed the arced slot section 63 of the track 59, coming to rest at the end of that arced slot section 63 which is disposed, in FIG. 15, directly below the pivotable shaft 23. Comparing FIG. 14 with FIG. 17, it will be noted that the tines of the fork 87 have been repositioned from a horizontal disposition to a vertical disposition, the guide 81 having been pivoted 90° about the longitudinal axis of the pivotable shaft 23. Of course, since the guides 81 are fixed to the valve disc 77, the valve disc 77 has, likewise, been pivoted 90° about the longitudinal axis of the pivotable shaft 23, the valve disc 77 coming to rest against a stop 103 which is fixed to the tubular extension 27 shown in FIGS. 11, 14 and 17. Each of the tubular extensions 27 of the valve have stops 103 fixed thereon and positioned to come into contact with the valve disc 77 when it is fully opened as shown in FIG. 17. The arrangement of each of the stops 103 in relation to their corresponding tubular extensions 27 are best shown in FIGS. 7 and 8 and, also, shown in FIGS. 3 and 6.

It will be noted from reference to FIGS. 15 and 18 that the radius 89 of the fork 87 of the guide 81 is in contact with the guide bearing 93. It remains in this position through the transition of the position of the guide 81 from that shown in FIG. 14 to that shown in FIG. 17, the pivotable shaft 23, the guide 81 and the valve disc 77 pivoting about the longitudinal axis of the pivotable shaft 23, as a unit. Referring to FIG. 16, it will also be noted that the positional relationship between the lever arm 67, curved link 69, and the valve disc 77 has not changed from that shown in FIG. 13, but rather, they have all pivoted 90° about the longitudinal axis of the pivotable shaft 23, the force and linear motion for movement of the valve disc 77 being applied through lever arm 67 and curved link 69 as disclosed hereinabove.

To close the valve, the sequence of operation is merely reversed, the pivotable shaft 23 being pivoted in the opposite direction. First the valve disc 77 is pivoted 90° to a position where its face is parallel to the plane of the valve seat 21. In the drawings this change is illustrated commencing with the arrangement illustrated in FIGS. 15-17 and moving to the arrangement illustrated in FIGS. 12-14. Once the valve disc 77 is positioned parallel to the valve seat 21, the valve disc 77 is advanced laterally forward, toward the left in the view illustrated in FIGS. 9-17, until the seal means 79 comes uniformly into contact with the valve seat 21 as shown in the arrangement change between FIGS. 12-14 and FIGS. 9-11.

According to the provisions of the patent statutes, the principle, construction and mode of operation of the present invention have been explained along with illustrations and a detailed description of what is presently considered to be the preferred embodiment of the invention. However, it is to be understood that the present invention may be practiced otherwise than as specifically illustrated and described, and the scope of the invention is defined by what is hereinafter claimed.

What is claimed is:

1. A disc-type valve comprising:
   (a) a valve body;
   (b) a valve seat mounted on the interior surface of said valve body and disposed therein so that the seating face of said valve seat is perpendicular to the general path of material flow through said valve body;
   (c) a pivotable shaft pivotably mounted through said valve body, the longitudinal axis of said pivotable shaft being positioned so as to be parallel to said seating face of said valve seat;
   (d) means for pivoting said pivotable shaft operable in conjunction with at least one end of said pivotable shaft, said at least one end which extends outwardly from said valve body;
   (e) means for translating said pivoting of said pivotable shaft into linear motion directed parallel to said general path of material flow through said valve body, said means for translating being arranged and positioned within said valve body such that said linear motion can be centrally directed within said valve body;
   (f) a valve disc flexibly connected to said means for translating, said valve disc being of sufficient size to permit it to mate with said seating face of said valve seat; said linear motion being applied to said valve disc through said flexible connection to cause said valve disc to move;
   (g) a pair of tracks, each of said tracks which is disposed adjacent to the periphery of said valve disc, each of said tracks being positioned directly opposite to the other, said tracks being mounted on the walls of said valve body, said tracks being positioned, on the walls of said valve body, each directly opposite the other, said pivotable shaft extending through each of said tracks;
   (h) a straight slot section, disposed on each of said tracks, extending generally linearly, perpendicular to said linear axis of said pivotable shaft, from the point on each of said tracks adjacent to where said pivotable shaft extends therethrough, toward said valve seat;

(i) cam means, mounted to said valve disc and fixed in position in relation to said valve disc, operable within said each straight slot section to traverse said each straight slot section;

(j) guide means fixed to said valve disc and operable with said pivotable shaft to maintain said valve disc in alignment parallel to said longitudinal axis of said pivotable shaft and said seating face of said valve seat, as said valve disc is moved into contact with or to leave contact with said seating face of said valve seat;

(k) an arced slot section, disposed in each of said tracks, forming a 90° arc adjacent to the arc of pivotation of said pivotable shaft, each of said arced slot sections forming a continuation of said straight slot section correlated therewith, said cam means being operable within each said arced slot section to traverse each said arced slot section from said point, adjacent where said pivotable shaft extends therethrough where said straight slot section commences, at which said arced slot section forms said continuation of said straight slot section, through an arc of 90°; and (l) means, mounted on said pivotable shaft and operable with said guide means, to maintain said valve disc in a set position in relation to said pivotable shaft, when said valve disc is not in contact with said seating face of said valve seat, such that the center of said 90° pivotation of said valve disc is said longitudinal axis of said pivotable shaft.

2. The invention described in claim 1 further comprising means for sealing off said at least one end of said pivotable shaft so as to maintain said material, flowing through said valve, within said general path of material flow through said valve body.

3. The invention described in claim 1 wherein said means for translating comprises:
(a) a lever arm centrally mounted to said pivotable shaft;
(b) a link means pivotably mounted to the end of said lever arm which is remote from said pivotable shaft.

4. The invention described in claim 1 wherein said flexible connection comprises:
(a) a clevis, centrally fixed to the side of said valve disc which is opposite from said valve seat, said clevis being pivotably mounted to said means for translating;
(b) means for pivotably mounting said clevis to said means for translating.

5. The invention described in claim 4 wherein said guide means comprises a pair of forked guides positioned each opposite the other in relation to the periphery of said valve disc, the forks of said guides extending from said valve disc toward said pivotable shaft, each of said forks being composed of a pair of tines, each parallel to the other and separated by a gap sufficient in size to permit said guide to traverse said pivotable shaft with said pivotable shaft being disposed between said tines; and wherein said means, mounted on said pivotable shaft and operable with said guide means, to maintain said valve disc in a set position in relation to said pivotable shaft, comprises a pair of bearings, each disposed concentrically on said pivotable shaft and positioned to align with said forks of said guides, said diametrical dimensions of said bearings being equivalent with said size of said gap between said tines of said forks, and said forks each having a radius between and at the bases of the tines thereof, said radii being equivalent to the radii of said bearings.

6. The invention described in claim 1 wherein said guide means comprises a pair of forked guides positioned each opposite the other in relation to the periphery of said valve disc, the forks of said guides extending from said valve disc toward said pivotable shaft, each of said forks being comprised of a pair of tines, each parallel to the other and separated by a gap sufficient in size to permit said guide to traverse said pivotable shaft with said pivotable shaft being disposed between said tines; and wherein said means, mounted on said pivotable shaft and operable with said guide means, to maintain said valve disc in a set position in relation to said pivotable shaft, comprises a pair of bearing, each disposed concentrically on said pivotable shaft and positioned to align with said forks of said guides, said diametrical dimensions of said bearings being equivalent with said size of said gap between said tines of said forks, and said forks each having a radius between and at the bases of the tines thereof, said radii being equivalent to the radii of said bearings.

7. The invention described in claim 1 wherein said valve body is tubular, said valve seat is a circular ring mounted within said tubular valve body perpendicular to the tubular axis of said tubular valve body, and said valve disc has a circular periphery.

8. The invention described in claim 1 further comprising a seal means disposed on said valve disc and positioned to be interposed between said valve disc and said seating face of said valve seat upon the said mating of said valve disc and said seating face of said valve seat.

9. The invention described in claim 1 further comprising stop means, mounted on said interior of said valve body, arranged to positively and directly prevent said pivotation of said valve disc more than 90° from said plane of said seating face of said valve disc.

10. The invention described in claim 1 further comprising means operable in regard to said valve body for engaging said valve body with a material flow system.

11. The invention described in claim 10 wherein said means for translating comprises:
(a) a lever arm centrally mounted to said pivotable shaft;
(b) a link means pivotably mounted to the end of said lever arm which is remote from said pivotable shaft;
and wherein said flexible connection comprises:
(c) a clevis, centrally fixed to the side of said valve disc which is opposite from said valve seat, said clevis being pivotably mounted to the end of said link means which is remote from said lever arm;
(d) means for pivotably mounting said clevis to said link means.

* * * * *